United States Patent Office 3,521,084
Patented July 21, 1970

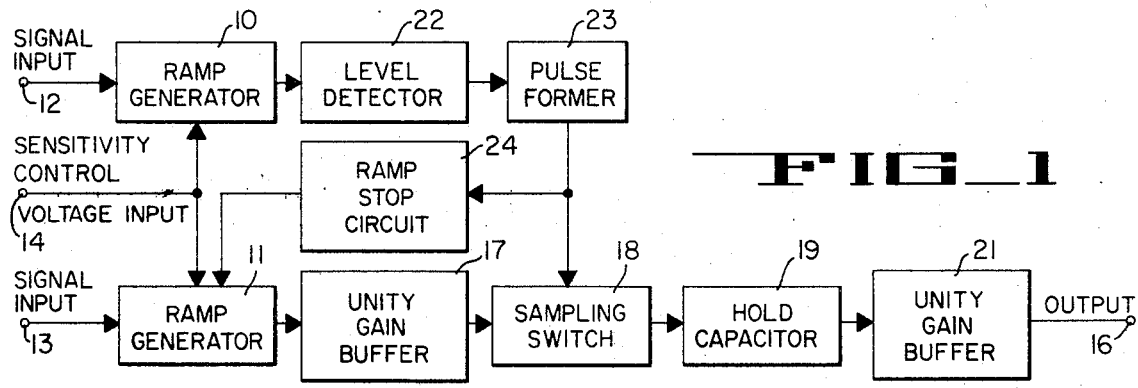
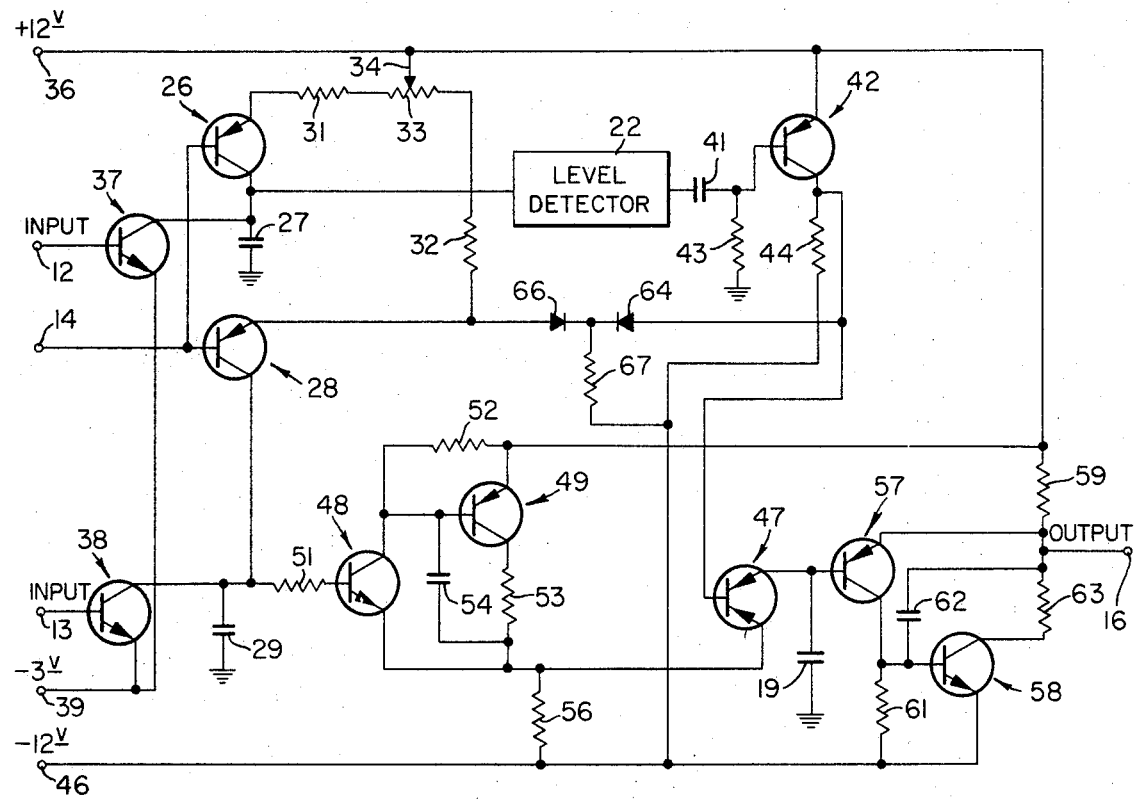

3,521,084
PHASE DISCRIMINATOR
James W. Jones, Redwood City, Calif., assignor to Ampex Corporation, Redwood City, Calif., a corporation of California
Filed June 7, 1967, Ser. No. 644,261
Int. Cl. H03k 9/06
U.S. Cl. 307—232
15 Claims

ABSTRACT OF THE DISCLOSURE

A circuit for detecting the phase difference between two input pulses by initiating the generation of two linear ramp signals in time correspondence with the two input pulses and subsequently comparing the levels of the ramps as an indication of the phase difference between the input pulses. Comparison of the ramps is accomplished by sampling the level of one ramp at the instant when the other ramp passes through a predetermined threshold level, such as zero. A fast acting ramp stop circuit stops the first ramp in response to the second ramp passing the threshold such that a hold capacitor may be charged to the level of the first ramp during a relatively long sampling interval.

BACKGROUND OF THE INVENTION

Various phase discriminators have been devised which employ the sample-hold technique to compare the phases of two input pulses. Typically, a linear ramp is initiated in response to one input pulse, and the level of the ramp is sampled by means of the second pulse. In this regard, the ramp is coupled to a hold capacitor through a sampling switch which is closed for the duration of a sampling pulse initiated in response to the second pulse. The capacitor is consequently charged to the level of the ramp that exists at the instant the second pulse is generated. The level stored on the hold capacitor is thus representative of the elapsed time between generation of the two pulses, and therefore the phase difference therebetween.

Previous sample-hold discriminator circuits of the foregoing type have suffered from excessvie drift due to temperature and supply voltage variations. Also of importance, sampling accuracy and reliability are limited by the relatively slow operating speed of existing sampling switches. By virtue of the slow operating speed, the sampling interval was heretofore made relatively long with the result that an excessive ramp length was sampled with an attendant reduction in accuracy. However, with existing circuits any reduction in the sampling interval requires the use of relatively small hold capacitors in order that they may be charged to a sufficiently high level during the sampling interval. Such small capacitors are limited in their hold times. It will be therefore appreciated that with previous sample-hold phase discriminators attempts to improve accuracy in one respect result in inaccuracy in other respects.

SUMMARY OF THE INVENTION

The present invention provides a sample-hold phase discriminator circuit having greatly improved accuracy. In accordance with one feature of the invention, a pair of ramp generators in balanced circuit configuration may be employed in such a manner as to provide a phase difference output signal that is substantially insensitive to temperature and supply voltage variations. In accordance with another extremely important feature of the invention, a ramp-stop circuit may be employed to facilitate increased sampling accuracy and reliability, while yet permitting the use of a very long sampling interval. By virtue of the long sampling interval a relatively large charge can be transferred to a hold capacitor. Thus, a large hold capacitor can be utilized and a long hold time attained.

The phase discriminator of the present invention basically includes first and second ramp generators each including, for example a capacitor and a constant current source coupled in charging relation to the capacitor. The constant current sources are arranged to initiate the supply of constant current to the capacitors in response to the leading edges of first and second input pulses to in turn initiate the generation of first and second ramp signals by the capacitors. Level detector means are coupled to the first capacitor to generate a sampling pulse of predetermined duration in response to the first ramp signal passing through a predetermined threshold. A sampling switch couples the second ramp capacitor to an energy storage means, preferably, a hold capacitor, and such switch is closed in response to and for the duration of the sampling pulse. The hold capacitor is thus charged to the level of the sceond ramp at the instant the first ramp passes through the predetermined threshold. The potential stored by the hold capacitor is thereby proportional to the difference between ramp levels at a common instant of time, and therefore the phase difference between the input pulses.

The basic circuit design outlined hereinbefore enables ramp capacitors and components of constant current sources to be appropriately matched and balanced such that any variations in temperature or supply voltage effect both ramp signals in a substantially identical manner. The overall operation is thereby rendered substantially insensitive to temperature and supply voltage variations.

With regard to the previously noted ramp-stop circuit, same is coupled between the level detector means and the second constant current source to rapidly terminate the flow of constant current therefrom to the second ramp capacitor in response to initiation of the sampling pulse and for the duration thereof. The second ramp signal is thus stopped at the instant the first ramp signal passes through the predetermined level and the constant stopped level is transferred to the hold capacitor during the sampling interval. The ramp being stopped, increased sampling accuracy and reliability is obtained even though a very long sampling interval is utilized.

BRIEF DESCRIPTION OF THE DRAWING

FIG. 1 is a block diagram of a phase discriminator in accordance with the invention.

FIG. 2 is a schematic circuit diagram of a preferred embodiment of the phase discriminator depicted by the block diagram of FIG. 1.

FIG. 3 is a graphical representation of time correlated wave forms appearing at various points of the circuit of FIG. 2.

DESCRIPTION OF THE PREFERRED EMBODIMENTS

Referring now to the drawing, FIG. 1 in particular, the phase discriminator of the present invention will be seen to include a pair of ramp generators 10 and 11 respectively coupled to input terminals 12 and 13 for receiving a pair of pulsed input signals to be phase compared. In response to a predetermined edge of the input signal pulses, the ramp generators respectively generate ramp signals having identical linear slopes determined by the potential applied to a sensitivity control voltage input terminal 14. The relative levels of the ramp signals at a given instant of time are representative of the time displacement between the predetermined edges of the signal pulses and therefore of the phase therebetween.

In order that the instantaneous ramp levels may be periodically compared to develop a signal at an output terminal 16 representative of the phase difference between the input signal pulses, the discriminator includes a "sample-hold" arrangement of unique design. In this regard, the output of ramp generator 11 is coupled, as by means of a unity gain buffer amplifier 17, to a sampling switch 18, in turn coupled to an energy storage means or hold capacitor 19. The capacitor is coupled to output terminal 16, as by means of a unity gain buffer amplifier 21. The sampling switch is normally open, but in response to a sampling pulse at a control terminal thereof closes to apply the then existing level of the ramp signal from generator 11 to the hold capacitor and charge same to a proportional level. The sampling pulse is developed by means of a level detector 22 coupled to the output of ramp generator 10, and in turn preferably coupled to a pulse former 23, the output of which is coupled to the control terminal of the sampling switch. The level detector is arranged to generate an output pulse in response to the ramp signal from generator 10 passing through a predetermined threshold, such as zero. This pulse is appropriately shaped by the pulse former 23 into a sampling pulse of predetermined fixed duration. The sampling switch is thus closed for substantially the duration of the sampling pulse and normally the portion of the ramp output of generator 11 existing over the duration of the sampling pulse would be coupled to the hold capacitor. This portion of the ramp is not of a single level such that in the interest of accuracy the sampling interval should be as short as possible. However, use of a short sampling interval requires that the hold capacitor be small in order that a significant charge may be accumulated thereon during the interval without requirement of excessive charging current. The hold time of the capacitor is therefore correspondingly limited. As a further difficulty that might otherwise be encountered, the sampling switch is normally speed limited in its actuation such that a relatively long time lag would exist between the time the ramp output of generator 10 crosses the threshold, and the time the ramp output of generator 11 is sampled. This of course would normally further detract from the accuracy of the discriminator.

The above noted limitations and difficulties are overcome in the present discriminator by the provision of a ramp stop circuit 24 coupled between the output of the pulse former 23 and the ramp generator 11. The stop circuit is arranged to be extremely fast acting in stopping the ramp output of generator 10 responsive to the leading edge of the sampling pulse from pulse former 23. With the ramp rapidly stopped substantially in time coincidence with the ramp output of generator 10 passing through the threshold, the stopped level may be accurately sampled even though the sampling switch 18 is slow acting. Moreover, the sampling interval determined by the pulse from pulse former 23 may be made relatively long without detracting from the accuracy of the measurement since the ramp has been previously stopped at a substantially fixed level. The hold capacitor 19 may be therefore relatively large with an attendant increase in the hold time of the discriminator.

Considering now a preferred circuit arrangement of the discriminator outlined hereinbefore, and referring to FIG. 2, the ramp generator 10 will be seen to comprise a constant current source including a transistor 26 having its emitter-collector path coupled in charging relation to a capacitor 27. Similarly, ramp generator 11 comprises a constant current source including a transistor 28 having its emitter-collector path coupled in charging relation to a capacitor 29. In the illustrated case, transistors 26 and 28 are of type PNP, and their collectors are connected to the capacitors 27 and 29 which are in turn connected to ground. The emitters of transistors 26 and 28 are coupled by means of equal ohmage bias resistors 31 and 32 to the opposite ends of a variable balancing resistor 33, the wiper 34 of which is connected to a positive bias supply terminal 36, herein designated as being at +12 volts. The amount of constant current flowing through the emitter-collector paths of transistors 26 and 28 is determined by the potential applied to the sensitivity control voltage input terminal 14, which is connected to the bases of the transistors.

The ramp generators 10 and 11 further include charge control transistors 37 and 38 for initiating charging of the capacitors 27 and 29, and therefore the generation of ramp signals in response to input pulses at terminals 12 and 13. Charge control transistors 37 and 38 are preferably of opposite conductivity type to constant current transistors 26 and 28, and thus in the illustrated case are of type NPN. The emitter-collector paths of the charge control transistors are respectively series connected between a reference bias terminal 39 of opposite polarity to terminal 36, and herein designated as being at −3 volts, and the junctions between the collectors of the constant current transistors and the capacitors 27 and 29. More particularly, the collectors of transistors 37 and 38 are connected to the above-noted junctions and the emitters are connected to terminal 39. The bases of such transistors are respectively connected to input terminals 12 and 13. The bias at terminal 39 is of a polarity to render the transistors 37 and 38 normally conducting whereby in the absence of input signal pulses at terminals 12 and 13, the capacitors 27 and 29 discharge to substantially the level of the reference bias at terminal 39 and the constant current through transistors 26 and 28 is bypassed around the capacitors. Responsive to input signal pulses at terminals 12 and 13, in the illustrated case negative going pulses, the transistors 37 and 38 are cut off, and the constant currents through transistors 26 and 28 begin linearly charging the capacitors from the level of the reference bias toward the level of the bias at terminal 36. Ramp signals of substantially identical slope are thus developed across the capacitors 27 and 29, and in the illustrated case the ramps change polarity and pass through zero in order that a bipolar error function may be derived at the output terminal 16.

In order that the ramp generators 10 and 11 be substantially free from drift, the transistors 26 and 28 and transistors 37 and 38 are preferably dual transistor pairs such that the transistors of each pair are substantially identically affected by temperature. The resistors 31, 32 and 33 and the ramp capacitors 27 and 29 are selected to be of the very highly temperature stable variety. This, in conjunction with the transistors operating from the common supply point terminals 36 and 39 renders the ramp generators substantially insensitive to temperature and supply voltage variations.

The junction between the collector of transistor 26 and capacitor 27 is connected to the level detector 22, which is of a commercially available type and therefore not detailed herein. The pulse former 23 preferably includes a capacitor 41 coupling the output of the level detector to the base of a transistor 42 connected to one side of a resistor 43, the other side of which is connected to ground. In the particular circuit configuration illustrated and described herein, the level detector generates a positive going pulse in response to the ramp developed across capacitor 27 crossing the predetermined threshold, and it is desired that the corresponding sampling pulse be negative. To this end, transistor 42 is preferably of type PNP and has its emitter connected to bias terminal 36, and its collector coupled by means of a load resistor 44 to a bias supply terminal 46 of opposite polarity, herein depicted as being −12 volts. In response to the leading edge of a positive pulse from the level detector the capacitor 41 and resistor 43 generate a positive spike at the base of transistor 42. The spike cuts the transistor off to thereby generate a negative pulse at its collector. This pulse is employed as the sampling pulse and has a predetermined duration related to the time constant of capacitor 41 and resistor 43.

The sampling switch 18 is preferably provided as a bidirectional transistor 47, in the illustrated case a type PNP, the base of which is connected to the collector of transistor 42 to receive sampling pulses generated thereat. One of the bidirectional electrodes of transistor 47 is connected to one side of the hold capacitor 19, the other side of which is connected to ground. The second bidirectional electrode of the transistor is connected to the output of the unity gain buffer amplifier 17. This amplifier preferably comprises a pair of cascaded complementary transistors 48 and 49, which in the illustrated case are respectively of types NPN and PNP. The base of transistor 48 is coupled by means of a current limiting resistor 51 of the junction between capacitor 29 and the collector of constant current transistor 28 so as to receive the ramp signal generated thereat. The collector of transistor 48 is connected to the base of transistor 49, as well as to one side of a bias resistor 52, the other side of which is connected to the positive bias terminal 36. The collector of transistor 49 coupled by means of a resistor 53 to the emitter of transistor 48. A decoupling capacitor 54 is connected between the base of transistor 48 and emitter of transistor 48, which emitter is connected to one side of a load resistor 56 having its other side connected to negative bias terminal 46. The emitter of transistor 48 thus defines the output of buffer amplifier 17 which is connected to the second bidirectional electrode of transistor 47.

The unity gain buffer amplifier 21 employed to couple hold capacitor 19 to the output terminal 16 is preferably of generally similar design as that just described for amplifier 17. In this regard, amplifier 21 preferably comprises a pair of cascaded complementary transistors 57 and 58, which in the illustrated case are respectively of types PNP and NPN. The base of transistor 57 is connected to the junction between hold capacitor 19 and bidirectional transistor 47. The emitter of transistor 57 is coupled to positive bias terminal 36 through a resistor 59, and is also connected to output terminal 16. The collector of transistor 57 is connected to the base of transistor 58 and to a load resistor 61 in turn connected to negative bias terminal 46. A decoupling capacitor 62 is connected between the collector and emitter of transistor 57. The emitter of transistor 58 is connected to negative bias terminal 46, while the collector of such transistor is coupled by means of a load resistor 63 to the output terminal 16.

Considering now a preferred arrangement for the ramp stop circuit 24, same will be seen to include a pair of series connected oppositely poled diodes 64 and 66 coupled between the collector of the pulse former transistor 42 and the emitter of the constant current transistor 28 of ramp generator 11. With the particular conductivity type transistors employed in the illustrative case, the positive terminals of diodes 64 and 66 are connected to the collector of transistor 42 and emitter of transistor 28, and the negative terminals of the diodes are commonly connected. A resistor 67 is connected between the negative terminals of the diodes and the negative bias terminal 46. Thus, diode 64 is conducting when transistor 42 is conducting, i.e., prior to the level detector 22 generating a pulse responsive to the ramp signal from generator 10 crossing the predetermined threshold. Diode 66 is at this time non-conducting since its negative terminal is at a positive potential slightly less than that of bias supply terminal 36 (i.e., slightly less than +12 volts in the illustrated case). The emitter of constant current transistor 28 is thus isolated from the negative bias terminal 46, and this transistor supplies constant current to capacitor 29 to generate the ramp output of generator 11. Moreover, when transistor 42 is rendered nonconducting to generate the negative sampling pulse at its collector responsive to the ramp output of generator 10 crossing the predetermined threshold, the diode 64 is correspondingly substantially instantaneously rendered nonconducting. Diode 66 is rendered conducting since its negative terminal is responsively switched negative. The resulting negative potential applied to the emitter of transistor 28 renders same nonconducting to terminate the supply of constant current to capacitor 29 and thus stop the generation of the ramp from generator 11.

The overall operation of the phase discriminator will be better understood upon reference to the exemplary waveforms of FIG. 3. Waveforms $a$ and $b$ are pulsed input signals to be phase compared which are respectively applied to input terminals 12 and 13. It is to be noted that signal $a$ lags signal $b$ in phase, and that the phase difference is decreasing with respect to time. In this regard, negative going pulse 68 of signal $a$ lags negative going pulse 69 of signal $b$ by a greater amount than the next successive pulse 71 of signal $a$ lags the next successive pulse 72 of signal $b$. At a time $t_1$, the leading edge of pulse 69 cuts off transistor 38 whereupon capacitor 29 is charged with constant current supplied through transistor 28. A ramp waveform $e$ is developed across capacitor 29 including a linear ramp 73 initiated at time $t_1$. In the illustrated case, ramp 73 extends from a negative potential, determined by the reference potential at terminal 39, to a positive potential and crosses the zero axis as indicated.

At a time $t_2$, the leading edge of pulse 68 cuts off transistor 37 to thereby initiate charging of capacitor 27 with constant current supplied through transistor 26. Thus, a ramp waveform $c$ is developed across capacitor 27 including a linear ramp 74 initiated at time $t_2$. The ramp 74 has the same slope as ramp 73 and extends from the negative reference potential to a positive potential, crossing the zero axis as indicated at time $t_3$. In the particular example described herein the level detector 22 is selected to have a threshold level of zero. Thus at time $t_3$, responsive to ramp 74 crossing the zero axis, the level detector triggers transistor 42 off for a period of time determined by capacitor 41 and resistor 43. As indicated by waveform $d$, a negative going sampling pulse 76 is generated at the collector of transistor 42 having a duration $t_3-t_4$. Diode 64 is responsively rendered nonconducting and diode 66 conducting in the interval $t_3-t_4$. Transistor 28 is turned off such that the ramp 73 across capacitor 29 is stopped during this interval and the level remains substantially constant as indicated at 77. The ramp stop circuit is extremely fast acting such that the constant level 77 is substantially that which exists when ramp 74 crosses the zero axis and, therefore, at time $t_3$ or the leading edge of the sampling pulse 76. The level 77 will be noted to be greater than zero in correspondance with the ramp 73 being initiated earlier than the ramp 74. The sampling pulse 76 also renders transistor 47 conducting momentarily after the ramp has been stopped at time $t_3$. The hold capacitor 19, in substantially the interval $t_3-t_4$, is consequently charged to a level 78 proportional to the stopped level 77 of ramp 73, as shown by waveform $f$ which is applied to output terminal 16. Upon termination of the sampling pulse at time $t_4$, the transistor 47 is rendered non-conducting and the transistor 28 is rendered conduteing. The ramp 73 then linearly increases in level and the level 78 is retained on the hold capacitor 19 over a relatively long hold or decay interval. At a time $t_5$ the input pulse 68 terminates and transistor 37 is rendered conducting to thereby terminate the ramp 74 and discharge capacitor 27 to the negative reference potential at terminal 39. Similarly, at time $t_6$ the input pulse 69 is terminated and transistor 38 is rendered conducting. As a result, ramp 73 is terminated and capacitor 29 is discharged to the negative reference potential at terminal 39.

At times $t_7$ and $t_8$ corresponding to the leading edges of the next input pulses 71 and 72 of waveforms $b$ and $a$, ramps 73' and 74' are initiated across capacitors 29 and 27. In the manner previously described, a sampling pulse 76' is generated and ramp 73' is stopped at a substantially constant level 77' at a time $t_9$. By virtue of the interval $t_7-t_8$ being less than the interval $t_1-t_2$, the stopped level 77' is proportionately less than the stopped level 77. Thus, in the duration of sampling pulse 76', hold capacitor 19 is charged to a level 78' correspondingly less than level 78. In this manner, the potential across the hold capacitor is representative of the phase difference between the pulses of the input waveforms a and b.

I claim:

1. A phase discriminator for generating a signal representative of the phase difference between first and second input pulse signals respectively having leading and trailing edges comprising first and second ramp generators for generating first and second equal slope ramp signals in response to the leading edges of the pulses of said first and second input signals, level detector means coupled to said first ramp generator for generating a sampling pulse in response to said first ramp signal rising to a predetermined threshold level, an energy storage means, a sampling switch coupling said second ramp generator to said energy storage means, and means coupling the sampling pulse generated by said level detector means to said second ramp generator and to said sampling switch for instantaneously sampling the level of said second ramp signal at a predetermined time during said sampling pulse and for closing said sampling switch to thereby store energy in said energy storage means in accordance with the sampled level of said second ramp signal.

2. A phase discriminator according to claim 1, further defined by said first ramp generator comprising a first capacitor, a first constant current source coupled in charging relation to said first capacitor, and means coupled to said first constant current source and first capacitor for initiating charging of the latter in response to each pulse of said first input signal to thereby initiate generation of said first ramp signal, and said second ramp generator comprising a second capacitor, a second constant current source coupled in charging relation to said second capacitor, and means coupled to said second constant current soure and said second capacitor for initiating charging of the latter in response to each pulse of said second input signal to thereby initiate generation of said second ramp signal.

3. A phase discriminator according to claim 1 wherein said energy storage means is a hold capacitor, and further defined by said ramp signals rising between negative and positive levels, and said predetermined threshold level being zero whereby said hold capacitor may be charged bipolarly.

4. A phase discriminator according to claim 2, further defined by said first and second constant current sources including first and second transistors each having emitter, collector, and base, and the means for initiating charging of said first and second capacitors including third and fourth transistors of opposite conductivity type to said first and second transistors and each having emitter, collector, and base, said first capacitor series connected between the emitter-collector circuit of said first transistor and ground, said second capacitor series connected between the emitter-collector circuit of said second transistor and ground, said third transistor having its emitter-collector path coupled between a source of reference potential and the junction between said first capacitor and emitter-collector path of said first transistor, said base of said third transistor coupled to receive said first input signal, said fourth transistor having its emitter-collector path coupled between said source of reference potential and the junction between said second capacitor and emitter-collector path of said second transistor, said base of said fourth transistor coupled to receive said second input signal, said reference potential rendering said third and fourth transistors conducting in the absence of pulses of said first and second signals at the bases thereof and non-conducting in the presence of said pulses, and a bias source coupled to the emitter-collector paths of said first and second transistors and a control voltage source coupled to the bases thereof to render said first and second transistors normally conducting.

5. A phase discriminator according to claim 4, further defined by said first and second transistors being a dual transistor pair, said third and fourth transistors being a second dual transistor pair, said first and second capacitors having high temperature stabilities, and a pair of equal high temperature stability resistors respectively connecting the emitter-collector paths of said first and second transistors to said bias source.

6. The phase discriminator according to claim 1 wherein said sampling pulses have leading and trailing edges, and said sampling pulse is coupled to said second ramp generator for sampling the level of said second ramp signal in time coinciding relation with the occurrence of the leading edge of said sampling pulse.

7. A phase discriminator according to claim 6, further defined by ramp stop means coupled between said level detector means and said second ramp generator for stopping the rise of the second ramp signal in response to the leading edge of and for the duration of said sampling pulse, said second ramp signal thereby having a constant level for the duration of said sampling pulse corresponding to the level existing at the time of the leading edge of the sampling pulse.

8. A phase discriminator according to claim 7, further defined by said first ramp generator comprising a first capacitor, a first constant current source coupled in charging relation to said first capacitor, and means coupled to said first constant current source and first capacitor for initiating charging of the later in response to each pulse of said first input signal to thereby initiate generation of said first ramp signal, said second ramp generator comprising a second capacitor, a second constant current source coupled in charging relation to said second capacitor, and means coupled to said second constant current source and said second capacitor for initiating charging of the latter in response to each pulse of said second input signal to thereby initiate generation of said second ramp signal, and said ramp stop means comprising means coupled to said second constant current source for terminating the flow of current therefrom to said second capacitor in response to the leading edge of and for the duration of said sampling pulse.

9. A phase discriminator according to claim 8, further defined by said first and second constant current sources including first and second transistors each having emitter, collector, and base, and the means for initiating charging of said first and second capacitors including third and fourth transistors of opposite conductivity type to said first and second transistors and each having emitter, collector, and base, said first capacitor series connected between the emitter-collector circuit of said first transistor and ground, said second capacitor series connected between emitter-collector circuit of said second transistor and ground, said third transistor having its emitter-collector path coupled between a source of reference potential and the junction between said first capacitor and emitter-collector path of said first transistor, said base of said third transistor coupled to receive said first input signal, said fourth transistor having its emitter-collector path coupled between said source of reference potential and the junction between said second capacitor and emitter-collector path of said second transistor, said base of said fourth transistor coupled to receive said second input signal, said reference potential rendering said third and fourth transistors conducting in the absence of pulses of said first and second signals at the bases thereof and non-conducting in the presence of said pulses, and a bias source coupled to the emitter-collector paths of said first and second transistors and a control voltage source coupled to the bases thereof to render said first and second transistors normally conducting.

10. A phase discriminator according to claim 9, further defined by said ramp stop means coupled to said second constant current source for terminating the flow of current therefrom to said second capacitor comprising an electronic switch having a normally open circuit path closeable in response to a leading edge of a pulse at a control input thereof, a second bias source of opposite polarity to said first bias source, means series connecting said second bias source to the junction between the emiter-collector path of said second transistor and said first bias source, and means coupling said level detector means to the control input of said electronic switch to close the current path thereof in response to the leading edge of and for the duration of said sampling pulse.

11. A phase discriminator according to claim 10, further defined by said electronic switch including a pair of series connected oppositely poled diodes between the junction between the emitter-collector path of said second transistor and said first bias source and the output of said level detector means, said second bias source coupled to the junction between said diodes.

12. A phase discriminator according to claim 11, further defined by said sampling switch being a bidirectional transistor having first and second bidirectional electrodes and a base, said first and second bidirectional electrodes respectively coupled to said second capacitor and said hold capacitor, said base of said bidirectional transistor coupled to said level detector to receive said sampling pulse.

13. A phase discriminator according to claim 12, further defined by said first and second transistors being a dual transistor pair, said third and fourth transistors being a second dual transistor pair, said first and second capacitors having high temperature stabilities, and a pair of equal high temperature stability resistors respectively connecting the emitter-collector paths of said first and second transistors to said bias source.

14. A phase discriminator for generating a signal representative of the phase difference between first and second input pulse signals comprising first and second input terminals for receiving said first and second input signals, an output terminal, first and second opposite polarity bias terminals, a reference bias terminal, a sensitivity control voltage terminal, first and second transistors of identical conductivity type and each having a base, emitter, and collector, said bases of said first and second transistors connected to said sensitivity control voltage terminal, first and second capacitors respectively connected between the collectors of said first and second transistors and ground, bias resistors coupling the emitters of said first and second transistors to said first bias terminal, third and fourth transistors of opposite conductivity type as said first and second transistors and each having a base, emitter, and collector, said bases of said third and fourth transistors respectively connected to said first and second input terminals, said collectors of said third and fourth transistors connected to the collectors of said first and second transistors, said emitters of said third and fourth transistors connected to said reference bias terminal, a level detector connected to the collector of said first transistor for generating a pulse responsive to the potential on said first capacitor reaching a predetermined level, a fifth transistor having a base, emitter, and collector, said emitter of said fifth transistor connected to said first bias terminal, a load resistor coupling the collector of said fifth transistor to said second bias terminal, a time constant circuit coupling said level detector to the base of said fifth transistor to determine the duration of sampling pulse generated at the collector thereof in response to a pulse from said detector, a pair of oppositely poled series connected diodes having a common junction therebetween, said diodes connected between the collector of said fifth transistor and the emitter of said second transistor, a bias resistor connected between said second bias terminal and the common junction between said diodes, a bidirectional transistor having a base and first and second bidirectional electrodes, said base of said bidirectional transistor connected to the collector of said fifth transistor, means coupling the collector of said second transistor to the first bidirectional electrode of said bidirectional transistor, a hold capacitor coupled between the second bidirectional electrode of said bidirectional transistor and ground, and means coupling said second bidirectional electrode to said output terminal.

15. A phase discriminator according to claim 14, further defined by said first and second transistors being a first dual transistor pair, said third and fourth transistor being a second dual transistor pair, said first and second capacitors being matched and having high temperature stabilities, and said bias resistors coupling the emitters of said first and second transistors to said first bias terminal being matched and having high temperature stabilities.

References Cited
UNITED STATES PATENTS

| | | | |
|---|---|---|---|
| 2,563,816 | 8/1951 | Butman | 328—133 |
| 2,799,784 | 7/1957 | Harris et al. | 307—295 |
| 3,015,737 | 1/1962 | Harris et al. | 307—295 |
| 3,312,894 | 4/1967 | Blake | 328—151 |

DONALD D. FORRER, Primary Examiner

H. A. DIXON, Assistant Examiner

U.S. Cl. X.R.

328—133